W. T. PARKER.
Cultivators.

No. 135,726. Patented Feb. 11, 1873.

Witnesses:
E. Wolff.
Francis McArdle.

Inventor:
W. T. Parker.
Per Attorneys.

UNITED STATES PATENT OFFICE.

WILLIAM T. PARKER, OF VERONA, MISSISSIPPI.

IMPROVEMENT IN CULTIVATORS.

Specification forming part of Letters Patent No. 135,726, dated February 11, 1873.

*To all whom it may concern:*

Be it known that I, WILLIAM T. PARKER, of Verona, in the county of Itawamba and State of Mississippi, have invented a new and Improved Cotton-Cultivator; and I do hereby declare that the following is a full, clear, and exact description thereof, which will enable others skilled in the art to make and use the same, reference being had to the accompanying drawing forming part of this specification.

The invention relates to cotton-choppers, and will be first fully described and then clearly pointed out in the claims.

Figure 1:
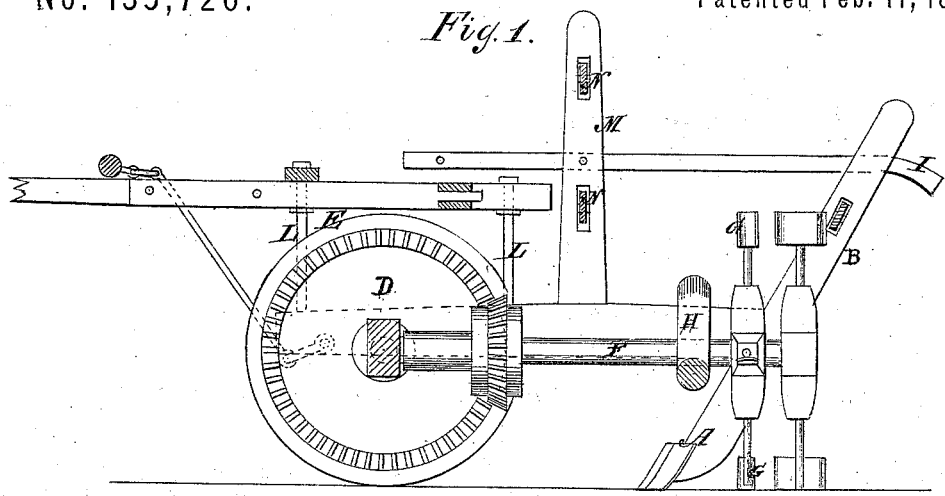
Figure 2:
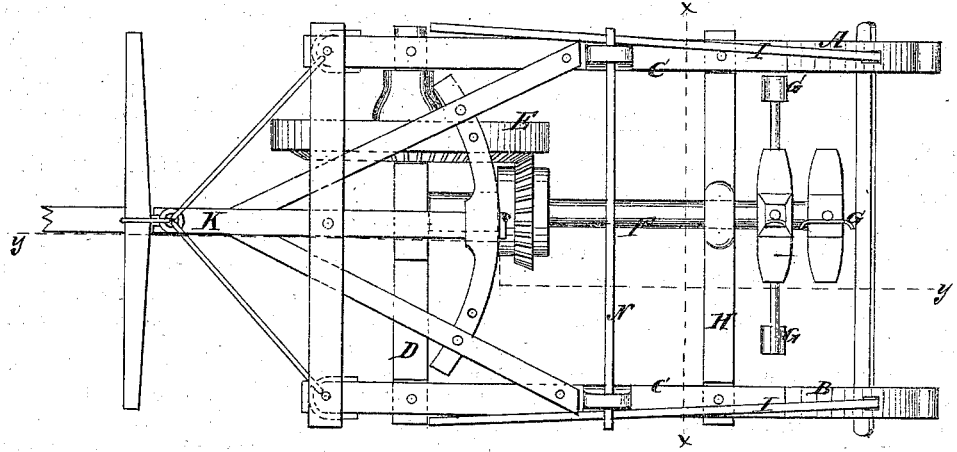
Figure 3:
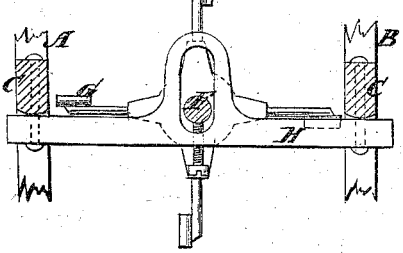

Figure 1 is a longitudinal sectional elevation of the improved machine, the section being on the line $y$ $y$ of Fig. 2. Fig. 2 is a plan view, and Fig. 3 is a transverse section of the same taken on the line $x$ $x$ of Fig. 2.

Similar letters of reference indicate corresponding parts.

A and B are two "scutic" plows framed together, with the side pieces C of the frame of the machine near the rear ends. The said pieces C are jointed near the front ends to a cross-piece, D, on which is a traction-wheel, E, which supports the front of the frame, and communicates rotary motion, by teeth properly arranged on one side, to the shaft F projecting rearward and carrying the rotary choppers G. The side pieces C of the frame are jointed to the cross-pieces D and H, so that they can vibrate to allow the plows which are guided by the handles I to be brought toward or from the row, as may be demanded by the condition of it. The two sides of the frame are prevented from shifting forward or behind each other by the connection of the same with the tongue K through the medium of the rods L, so that it draws each side alike. The said rods rise sufficiently above the said sides to support the tongue above the wheel E. A vertical bar, M, rigidly connected to the side piece, rises from each a considerable height near the center, and, being connected by the cross-bars N loosely jointed to it, assists in keeping the frame in proper shape while allowing the plows to be vibrated. The rear support for the shaft F is elongated vertically to allow the height of the choppers to be regulated by the ground along which they run.

I propose to use any kind of hoeing or scraping plow that can be used on a scutic stock, and is adapted for scraping or hoeing cotton and the like. The long handles I, passing through mortises in the plow-stocks, are connected to the bars M, and arranged to be pushed forward when not in use or when it is preferred to have them short; but they may be adjusted to project considerably behind the stocks.

Having thus described my invention, I claim as new and desire to secure by Letters Patent—

1. The vibrating side pieces C C, jointed to cross-pieces D H and connected with tongue K, as described, and for the purpose set forth.

2. The combination of a chopper-shaft, F, with bearing-pieces D H, when the rear one of them has a vertical and elongated slot, as and for the purpose described.

WILLIAM T. PARKER.

Witnesses:
    G. W. HARRIS,
    R. A. ESTES.